Dec. 1, 1931.  A. J. WEATHERHEAD, JR  1,833,982
FITTING FOR AUTOMOBILES
Filed June 8, 1928   2 Sheets-Sheet 1
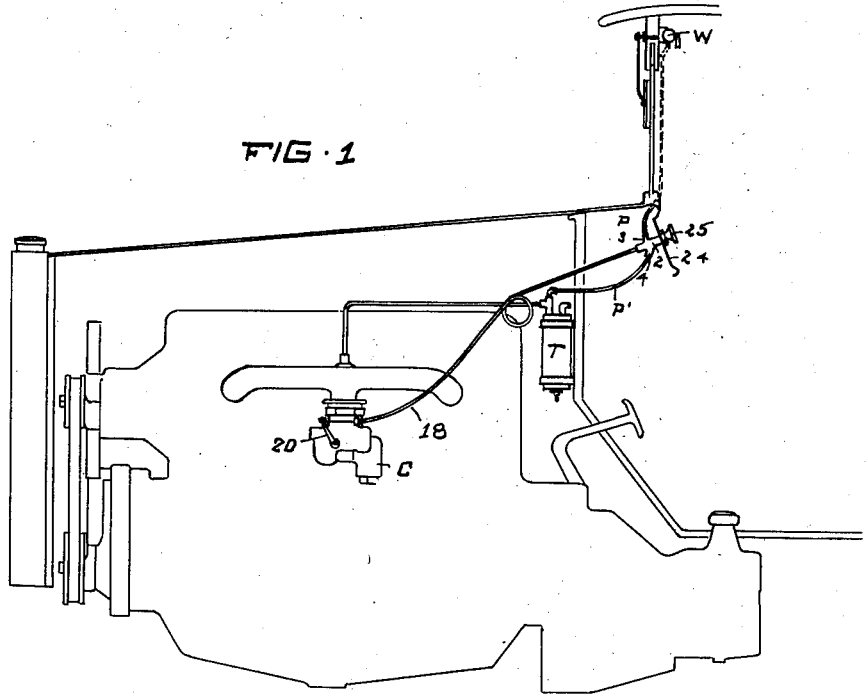
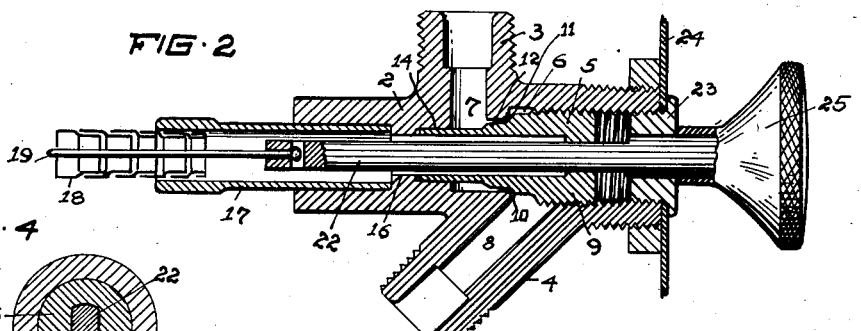
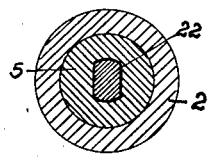
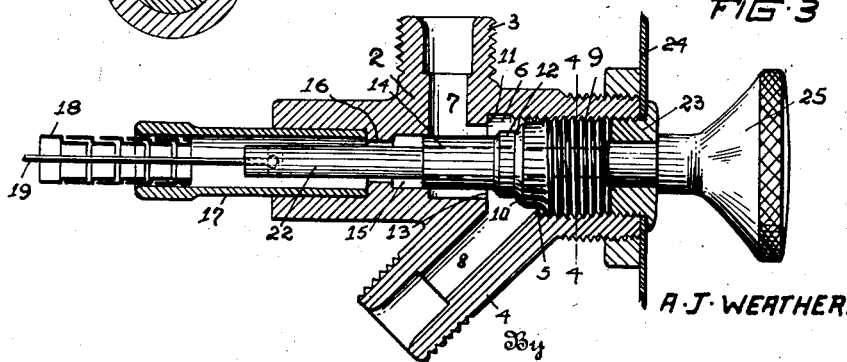
Inventor
A. J. WEATHERHEAD JR.
By Fisher, Moser & Moore
Attorney Dec. 1, 1931.  A. J. WEATHERHEAD, JR  1,833,982
FITTING FOR AUTOMOBILES
Filed June 8, 1928  2 Sheets-Sheet 2

Inventor
A. J. WEATHERHEAD JR.
By Fisher, Moser & Moore,
Attorney

Patented Dec. 1, 1931

1,833,982

UNITED STATES PATENT OFFICE

ALBERT J. WEATHERHEAD, JR., OF CLEVELAND, OHIO

FITTING FOR AUTOMOBILES

Application filed June 8, 1928. Serial No. 283,910.

This invention pertains to an attachment or fitting for automobiles, by means of which a plural number of appliances, for example, a windshield cleaner and the choke valve of a carburetor, may be operatively controlled from one spot or place on the dash or instrument board of the automobile. The general practice is to provide two individual fittings at separated places on the instrument board for controlling such radically different fittings as the carburetor and the windshield cleaner. My object in general is to provide a single unit or fitting which will take place of the two devices used heretofore, thereby conserving space on the instrument board, simplifying the assembly operations, reducing the costs, and providing a single device which may be manipulated with one hand at one spot or place on the instrument board to control the operation of the windshield cleaner and also the engine carburetor.

Figure 5:
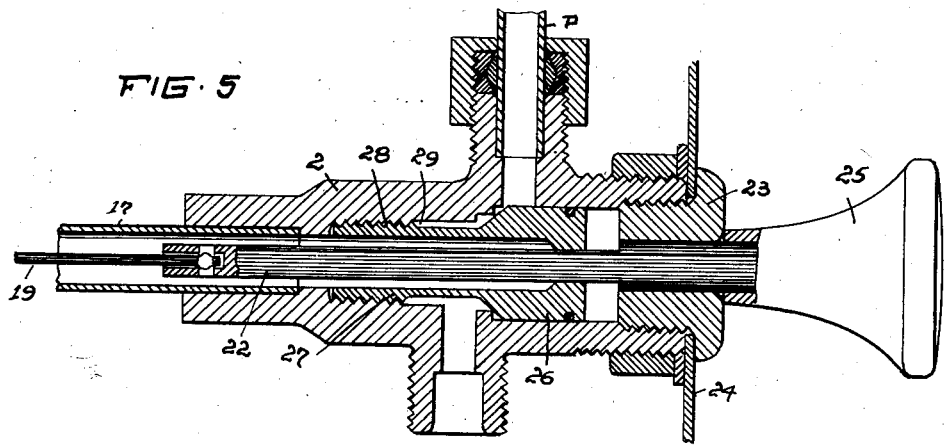
Figure 6:
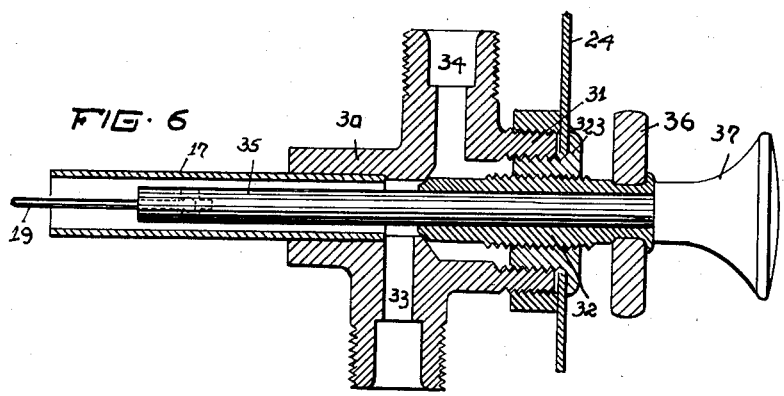
Figure 7:
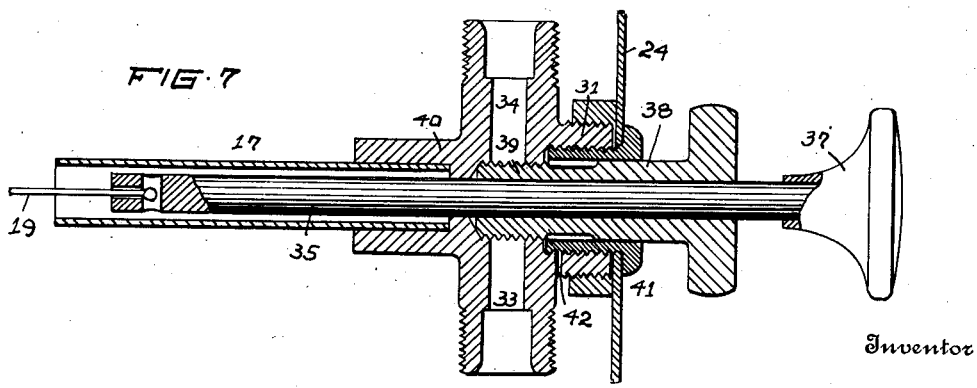

In the accompanying drawings, Fig. 1 is a side elevation of my improved fitting mounted upon the dash of a vehicle and connected to a windshield wiper and a carburetor. Fig. 2 is a sectional view, on an enlarged scale, of the fitting itself with the valve closed and the choke pushed in to its limit. Fig. 3 is a sectional view of the device with the valve open. Fig. 4 is a cross section on line 4—4 of Fig. 3. Figs. 5, 6, and 7 are sectional views of three modified forms of the invention.

The attachment or fitting consists of a relatively small cylindrical body 2 having two lateral branches 3 and 4 adapted to be easily coupled to two small copper pipes P and P', respectively.

These pipes lead to a windshield wiper W and a vacuum or suction tank T, respectively, such as used commonly in automobiles equipped with internal combustion engines. A rotatable valve member 5, confined within a longitudinal chamber 6 in body 2, controls communication between the cross passages 7 and 8 in branches 3 and 4, respectively. As shown, valve member 5 embodies a screw-threaded enlargement 9 flanked by a beveled shoulder 10 which is adapted to engage a sharp-cornered shoulder or valve seat 11 at the base of chamber 6. A tapered prolongation 12 is also provided in advance of beveled shoulder 10 to effect gradual opening and closing of the main fluid passage 13 in body 2. A relatively long cylindrical extension 14 is also provided at the inner end of valve member 5 to fit and slide within a reduced bore 15 in the body, where it may seal the inner end of passage 13 more or less tightly, especially when body 2 also contains a still smaller bore 16 which opens into a short tube 17 fixed to one end of body 2. Tube 17 may be a continuation of a small pipe or flexible conduit 18 which is commonly used to house a wire 19 which extends to and connects with the operating lever 20 for the choke valve in carburetor C. Wire 19 is swiveled or rotatably connected to a push and pull rod 22 which is flattened on one or two sides for its major length and extends through a correspondingly-shaped opening centrally of the enlarged portion 9 of valve member 5 so that a rotatable movement of the rod will rotate the valve member and thereby cause said member to move longitudinally within body 2 to either open or close the suction passages.

The round outer end portion of rod 22 extends through a round opening in a flanged nut 23 having screw connection with body 2. Nut 23 is used to clamp body 2 rigidly to a sheet metal wall 24, which wall in the present instance represents the instrument board beneath the windshield in an automobile. Thus, rod 22 is free to turn within nut 23 and also free to slide back and forth in respect thereto, and a handle or knob 25 is secured to the end of the rod within convenient reach of the driver of the vehicle so that he may rotate or pull and push it, as he may elect. In fact the rod may be rotated and also shifted lengthwise within body 2 at the same time, thereby permitting the operator to control both the choke valve and the windshield wiper at the same time. Or either one of these two devices may be controlled independently, using the single knob or handle 25 to open and close the wiper valve or the carburetor choke valve.

The attachment device may be modified in various ways and particulars and still effect the desired results flowing out of the invention, and therefore I do not limit myself exclusively to the exact form of device illustrated and described.

For example, referring to Fig. 5, a rotatable valve member 26 may be used having a reduced extension 27 which is screw-threaded to connect with corresponding screw-threads 28 in a reduced bore 29 in body 2. Except for such change and a slightly different arrangement of the pipe connections, the fitting is the same as hereinbefore described.

Referring to Fig. 6 the valve body 30 therein shown comprises a clamping ring 31 which is screw-threaded externally and internally. A screw-threaded valve 32 extends through this ring to control communication between the suction passage in branches 33 and 34, respectively. Valve member 32, in this case, has a round axial opening through which a round push and pull rod 35 extends, and the rod is free to rotate as well as to slide within the valve member. One end of the valve member is provided with a finger grip 36 which is exposed at the front of the instrument board 24, and rod 35 carries a flaring knob or handle 37 immediately in front of the gripping and actuating member 36 for the valve. In this form of the invention the valve and rod are operated independently by separate handles which are concentrically related at one and the same spot or place on the instrument board.

The fitting shown in Fig. 7 corresponds closely to the fitting shown in Fig. 6, excepting that the valve member 38 is screw-threaded at its inner end 39 and screw-connected at that point to body 40. The clamping nut 41 within this device is provided with a smoothly finished bore for valve member 38, and a vent opening 42 is formed in body 40 at the inner end of the nut. The purpose of this vent is to prevent escape of air which may leak past the threads of the valve member thus facilitating manual movement of the windshield wiper.

What I claim, is:

1. In a fitting for a motor driven vehicle having a vacuum operated windshield wiper and an engine carburetor; a fitting comprising a body member having pipe coupling connection for the windshield wiper and the engine, valved means in said body member for controlling the operation of the windshield wiper, and manually engageable means for operating said valved means and for controlling the operation of the carburetor.

2. In an automobile having a vacuum-operated windshield cleaner and an engine carburetor; a fitting comprising a valve body having pipe connections with the windshield cleaner and the engine, means for attaching said valve body to a fixed part of the automobile, a shiftable member extending through said body for controlling the operation of the engine carburetor, a valve member within said body for controlling the operation of the windshield cleaner, and means exposed at the instrument board for activating said valve and shiftable members alternatively.

3. A fitting for the instrument board of an automobile, comprising a valve body having a rotatable valve therein, and a push and pull device slidably connected to and adapted to rotate said valve.

4. A fitting for the instrument board of an automobile, comprising a valve body containing a rotatable valve member, a slidable device connected to said valve adapted to rotate the same, and a wire having swiveled connection with said device.

5. A fitting for the instrument board of an automobile, comprising a valve body, a nut for clamping said body to the instrument board, a valve member within said body, a push and pull rod extending through said valve member having a finger grip at one end and a swiveled connection at its opposite end.

6. A fitting for the instrument board of an automobile comprising a valve body having pipe and conduit connections, a rotatable valve within said body, a shiftable member slidably connected to said valve, and a wire attached to said shiftable member extending through the conduit connection.

7. In an automobile having an instrument board; a fitting connected to said board, a longitudinally-movable valve within said fitting for controlling a windshield cleaner, a longitudinally-movable element connected to said valve for controlling the operation of a carburetor, and means for alternatively operating said valve and element.

In testimony whereof I affix my signature.

ALBERT J. WEATHERHEAD, Jr.